A. MARSHALL.
DRAFT-TIPS FOR VEHICLES.
No. 194,098. Patented Aug. 14, 1877.
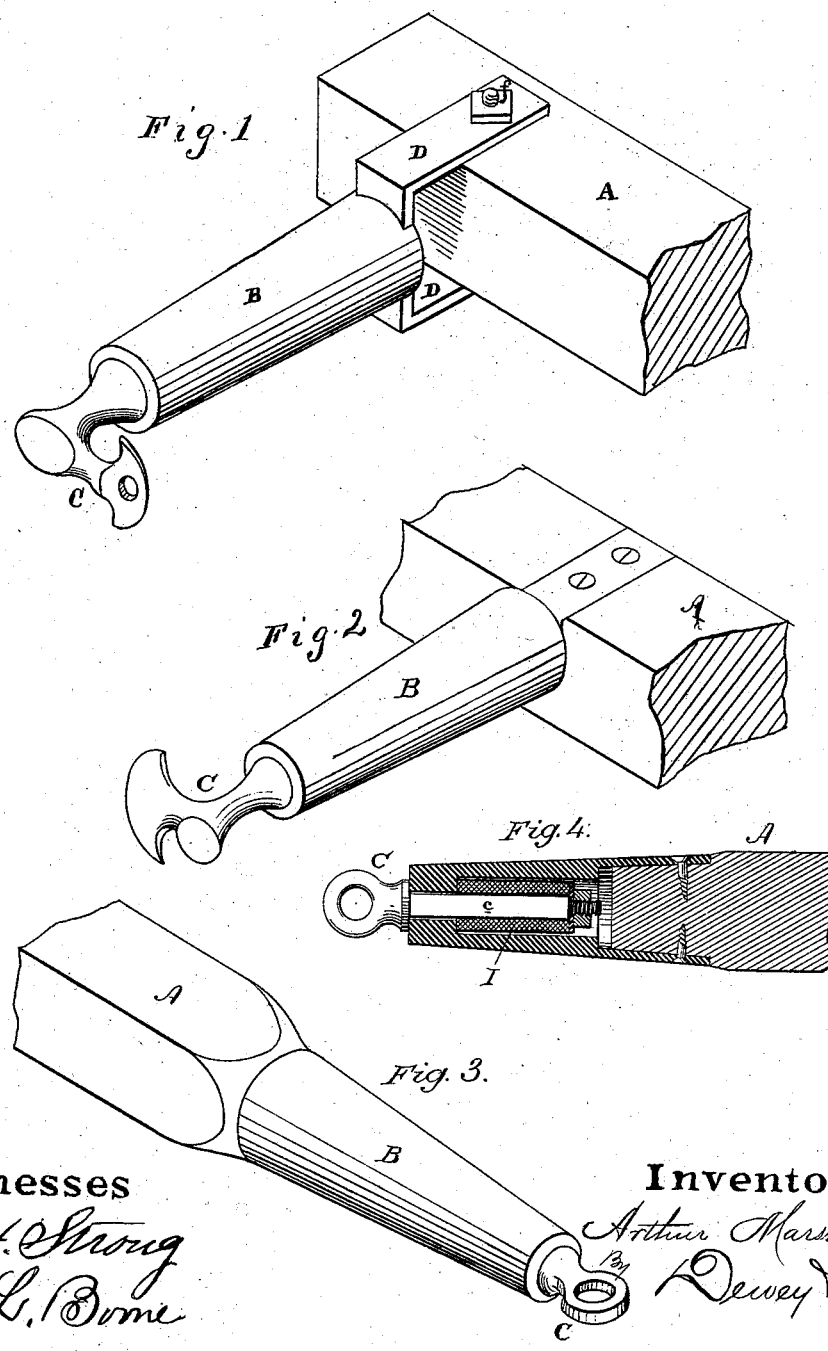

UNITED STATES PATENT OFFICE.

ARTHUR MARSHALL, OF SAN FRANCISCO, CALIFORNIA.

IMPROVEMENT IN DRAFT-TIPS FOR VEHICLES.

Specification forming part of Letters Patent No. 194,098, dated August 14, 1877; application filed June 18, 1877.

*To all whom it may concern:*

Be it known that I, ARTHUR MARSHALL, of the city and county of San Francisco, and State of California, have invented Improved Draft-Tips for Vehicles; and I do hereby declare the following to be a full, clear, and exact description thereof, reference being had to the accompanying drawings.

This invention relates to improvements in elastic draft-tips for vehicles; and consists in the construction and arrangement of parts, as will be hereinafter fully described.

Referring to the accompanying drawings, Figures 1, 2, and 3 are perspective views of my invention. Fig. 4 is a sectional view.

Let A represent the cross-bar, which connects the rear end of a pair of thills or other rigid bar in front of a vehicle. B is the barrel, within which the shank $c$ of the tip C, to which the harness-trace is fastened, is secured. Surrounding the shank $c$ of the tip is a spring, I, one end resting or abutting against a shoulder in the barrel, and the spring being adjustably secured upon the shank $c$ of the tip by a nut and washer, all as clearly shown in Fig. 4. This barrel I provide with one or more arms or extensions, D, which project to the rear in a line with the barrel, and said barrel, with the spring and tip, are arranged on a horizontal line with the draft.

The elastic tip can be fixed permanently to the cross-bar, or attached so that it will move sidewise, as desired.

In Fig. 1 the barrel is represented as having two arms—one which extends above and the other below the cross-bar, and the two are secured to the bar by a bolt, $f$, which passes through the bar, and the ends of the arms thus allowing the tip to swing a short distance to either side.

Fig. 2 represents the tip-barrel permanently secured to the cross-bar by a single projecting arm.

Fig. 3 represents the barrel rigidly attached to the front end of a shaft or thill, appropriate for a tandem-team.

The special device employed for attaching the draft-tip forms no part of my invention, as it could be varied indefinitely.

My invention consists simply in attaching the tip directly to the rigid cross-bar of a vehicle, or to the forward end of the thills, as above specified, without the intervention of whiffletrees or single-trees.

My invention is especially adapted to light vehicles, such as carriages, buggies, dog-carts, and the like. It gives a more reliable pull or draft, and is much neater in appearance than the ordinary devices for attaching traces to vehicles.

I am aware that a spring-whiffletree, adapted for fastening in rear of the shaft's cross-bar, and provided with yokes, and terminating in hooks or other devices for the attachment of the tugs, is old, and such I do not claim as my invention; but

Having thus described my invention, what I claim, and desire to secure by Letters Patent, is—

An elastic draft-tip for vehicles, consisting of the barrel B, having tip C, with its shank $c$, and spring I secured therein, said barrel being attached directly to the rigid cross-bar or forward end of the thills, on a line therewith, substantially as and for the purpose herein shown and described.

In witness whereof I have hereunto set my hand and seal.

ARTHUR MARSHALL. [L. S.]

Witnesses:
OLWYN T. STACY,
FRANK A. BROOKS.